United States Patent Office 3,666,565
Patented May 30, 1972

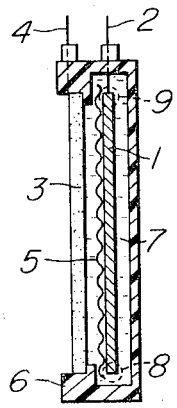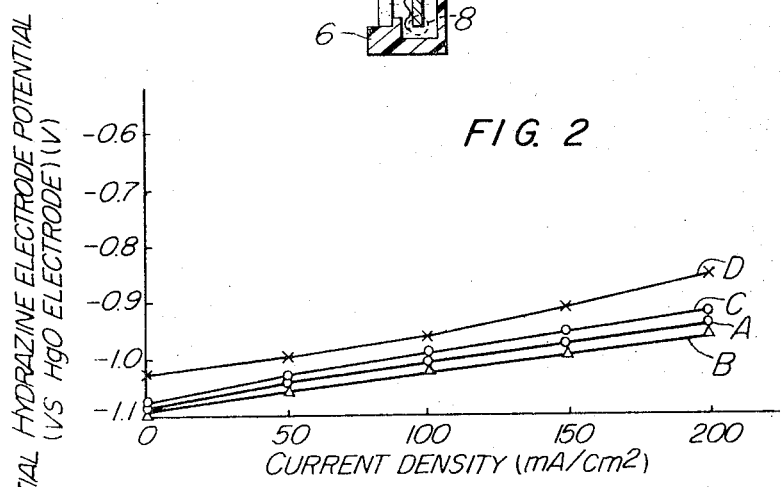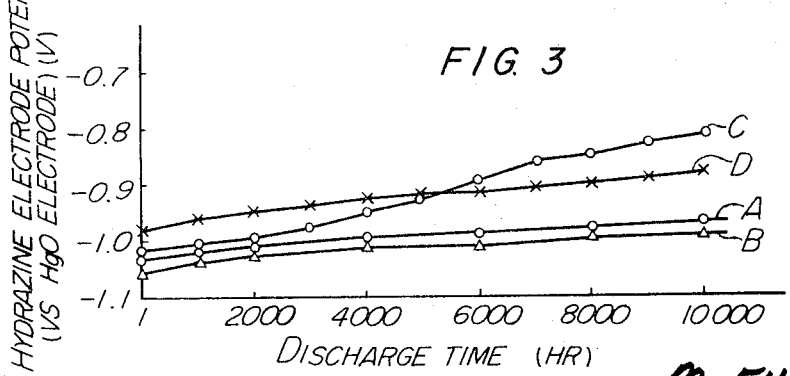

3,666,565
METHOD FOR PREPARING AN ELECTRODE
FOR FUEL CELL
Masataro Fukuda, Toyonaka-shi, and Tsutomu Iwaki, Kyoto, Japan, assignors to Matsushita Electric Industrial Co., Ltd., Osaka, Japan
Filed Dec. 22, 1969, Ser. No. 887,043
Claims priority, application Japan, Dec. 26, 1968, 43/667; Nov. 10, 1969, 44/28,767; Apr. 30, 1969, 44/34,373; Sept. 18, 1969, 44/75,582
Int. Cl. H01m 13/04; C22b 3/00; C23c 3/02
U.S. Cl. 136—120 FC                  11 Claims

ABSTRACT OF THE DISCLOSURE

An electrode for fuel cell using such a fuel hydrazine is prepared by forming a mixture containing nickel and antimony, and further containing copper, iron, etc., by reducing their salts and further reducing the mixture after a metal salt of platinum group has been added thereto. Better discharge performance and durability can be obtained than with a platinum group, though the amount of a metal of the platinum group to be added is decreased. In that case, the carriers are better carriers for the metal of the platinum group, endowing a promoter effect and having less deterioration of the electrode function.

This invention relates an an electrode for fuel cell, and particularly to a method for preparing a fuel electrode for a fuel cell using such an active fuel as hydrazine, sodium borohydride, etc. The present invention is characterized by preparing a mixture of nickel and antimony from a solution mixture of nickel salt and antimony salt, and then adding a salt of the platinum group to the mixture and forming a metal of the platinum group by reduction. Further, the present invention is caracterized by using salts of copper, iron, etc. in addition to the nickel salt and the antimony salt, making copper, iron, etc. present in the mixture containing the nickel and the antimony, and then forming the metal of the platinum group.

An object of the present invention is to obtain a high performance electrode of long life, which cannot be obtained from a metal of the platinum group.

In the so-called fuel cell from which electric power is generated by electrochemical oxidation of a fuel, such fuels as hydrazine, sodium borohydride, etc. are so active that polarization is small at the discharge of the fuel electrode to which said fuels are supplied, even under the discharge of higher current density, and accordingly, these fuels have been regarded as a fuel for a small-size high-output fuel cell. That is to say, in a cell consisting of a gas diffusion electrode which is actuated by supply of a suitable oxidizing agent, for example, air or oxygen, and the counter-posed fuel electrode, where an electrolyte, an oxidizing agent and a fuel are supplied to these electrodes, an electric discharge can be effected at a high current density by adding a suitable catalyst to both electrodes. That is to say, a cell can be made smaller and the number of cells can be reduced thereby for a given load. As the catalysts for these electrodes, active carbon, silver, platinum, palladium, metal oxides, etc. have been generally used for the oxidizing electrode (oxygen electrode or air electrode), and platinum, palladium, alloy catalysts of these metals with other metals, etc. have been used for the fuel electrode. As the active carbon or silver is used as the oxidizing electrode, the catalyst for the fuel electrode is generally more expensive than that for the oxidizing electrode. Thus, in order to reduce the cost, many proposals have been heretofore made as regards the method for adding a catalyst to the fuel electrode, the amount of the catalyst to be added, additives, etc.

Further, such fuels as hydrazine, sodium borohydride, etc. are very active and are ued after they have been dissolved in an electrolyte, and thus the fuel electrode is a liquid immersion-type electrode which will require no consideration at all as to possible leakage of liquid or corrosion of the electrode which is readily brought about when one is a liquid feed and the other is a gaseous feed as in the gas diffusion electrode. Accordingly, as the catalysts, such various metals and metal compounds as nickel black, nickel boride, iron mixtures of nickel with other various metals, cobalt and cobalt boride have been heretofore studied in place of such expensive metals of the platinum group as platinum and palladium. These non-noble metal catalysts are considerably effective for the electrochemical oxidation of a fuel, because the fuel is very active and the electrode is of the liquid immersion type. It has been observed by measurement made within a very short period of time by means of an electrochemical measuring apparatus or in the incipient performance of the cell that the non-noble metal catalyst sometimes attains better discharge performance than the metal catalysts of the platinum group.

However, when polarization is effected for a prolonged period of time, for example, at a constant current, its electric potential gradually shifts toward the noble side and the so-called discharge performance is gradually deteriorated. Recently, various improvements have been made to the gas diffuion electrode, for example, air diffusion electrode, and its life has been remarkably improved. For example, in the discharge at a current density of about 30 to 80 ma./cm.$^2$, a decrease in electric potential of the gas diffusion electrode took place for about 2,000 to 5,000 hours and deteriorated in the past, but recently, no deterioration has been brought about till about 10,000 to 30,000 hours. Upon considering said fuel electrode with respect to operating life, the durable life is about 3,000 to 6,000 hours for the case of platinum or palladium, but 3,000 hours or less for the case of the substituent nickel group, iron group, cobalt group, etc. though there is some difference therebetween depending upon the metal used. After such an elapsing of time, the cell potential becomes practically unavailable. Various reasons have been assumed for the deterioration in performance of the metal catalysts which have been studied in place of the metals of the platinum group: firstly, disengagement of the catalyst metal from the electrode matrix, deterioration of catalytic activity due to the formation of oxides on the metal surface, and contamination with the discharge product or discharge intermediate product or products by side reaction are principal causes, and it seems that the non-noble metal catalysts are influenced to a greater extent by these unfavourable causes than the catalysts of the platinum group.

Though the metal catalysts other than the catalysts of the metal of the platinum group have said drawbacks, nickel, among others, is excellent in alkali resistance, when a caustic alkali is used as an electrolyte, and has a substantial catalytic activity on such active fuels as hydrazine, etc. Nickel is very cheap, as compared with the metals of the platinum group, and thus is one of the most promising catalyst constituent materials owing to the foregoing advantages. Accordingly, attempts have been heretofore made to add elements principally of almost all the possible metals to nickel and studies have been made as to the catalyst in the form of a mixture or alloy. However, in the catalysts where said elements are added to nickel as additives, no practical durability in the catalyst performance has been obtained yet, though there have been some differences in performance.

However, it has been found that, when a catalyst of the platinum group is added to such nickel, even though the amount of the catalyst of the platinum group is small, an electrode having better discharge performance and durability can be obtained than the electrode obtained by merely adding the catalyst of the platinum group to the electrode matrix. Accordingly, it seems that in that case the nickel not only serves as a good carrier for the platinum, etc., but also can endow its catalytic activity to the catalytic activity of the metal of the platinum group.

The present invention is to provide a method for preparing an electrode capable of making its activity much higher and its durability longer in electrodes where a catalyst of the nickel group is used as a carrier for the catalyst of the metal of the platinum group, characterized by forming a mixture of nickel or nickel boride and antimony from a solution mixture of nickel salt and antimony salt by reduction, then adding a solution of a metal salt of the platinum group to the mixture and reducing the added mixture. A further feature of the present invention is that metal salts other than the nickel and antimony salts, that is, salts of iron, copper, cobalt, tungsten, silver, etc., particularly a solution of an iron salt and a copper salt, are added to the solution mixture to allow these metals to be contained at the same time in the mixture of nickel and antimony.

In said attempts to add other metals to the nickel, antimony was involved, but it was revealed by the studies that the effect of antimony was low only in a mixture of nickel and antimony. It has been found, however, that the effect of antimony can be attained to maximum by a combination of nickel, antimony and a metal of the platinum group, and the present invention is based on such finding. In that case, the effect, of course, means that not only the discharge performance is increased, but also the durability can be maintained for a prolonged period of time.

By a combination of a group of nickel and antimony, or further a group of nickel and antimony containing copper, iron or other metal, with a metal of the platinum group, an electrode having a catalytic activity of better discharge performance and durability can be obtained even if an amount of such expensive metal of the platinum group as platinum, palladium, etc. to be added is decreased than when merely a large amount of a metal of the platinum group is used and in that case, nickel and antimony not only serve as a good carrier for the metal of the platinum group is used and in that case, nickel and themselves, whereby their synergistic effect can be obtained.

As a method for preparing such electrochemical catalyst of a mixture of nickel and antimony, pyrolysis of these two salts of nickel and antimony, reduction by hydrazine in an aqueous alkaline solution, reduction by sodium borohydride, etc. are used. In that case, it is preferable to prepare the mixture directly from a solution mixture of the respective salts, rather than to prepare it by separately forming the respective components and mixing them. Further, in preparing a combination of said mixture with the catalyst of the metal of the platinum group, it is necessary to add the salt of the metal of the platinum group to the mixture, once prepared from the solution mixture of the nickel and antimony salts, rather than to prepare the combination directly from a solution mixture of the nickel and antimony salts and platinum or palladium salt. The most preferable method among those for preparing an electrode having such catalytic activity, is comprised of using a porous sintered material, particularly a sintered nickel as an electrode matrix, forming a layer of a mixture of nickel and antimony or a mixture of nickel and antimony and copper, iron or other like metal thereon in advance, and depositing thereon platinum, palladium or the like metal of the platinum group by utilizing a difference in oxidation potential from the salts of platinum, palladium, etc. In that case, thermal decomposition in a hydrogen stream is particularly preferable as a reduction method for obtaining a mixture of nickel and antimony, and when copper or iron is added to the solution mixture, reduction by hydrazine in an alkaline solution is excellent. Further, in depositing platinum, etc., use of principally non-aqueous solvent such as alcohol or acetone is preferable as a solvent for the salt of the metal of the platinum group with respect to the adhesion thereof to the electrode as well as the discharge performance, than water. Further, when such an organic solvent is used, complete deposition of the metal of the platinum group only onto nickel cannot be attained at all even with a prolonged standing and a portion of the metal remains in the solvent as a salt solution, but when antimony, or, copper, iron, etc, are involved therein, the metal of the platinum group can be deposited almost completely. It is clear that its adhesion is sufficient and such effect can be attained when antimony is added thereto, quite different from the case where the complete deposition is effected by using water principally.

EXAMPLE

A hydrazine electrode for an air-hydrazine fuel cell is prepared in the following manners.

(1) Nickel chloride and antimony chloride are mixed together so that a ratio of nickel to antimony may be 6:4, and 75 g. of water is added to 100 g. of the mixture to prepare an aqueous solution thereof. In that case a very small amount of hydrochloric acid may be added to the aqueous solution to prevent hydrolysis of antimony chloride. A sintered nickel plaque obtained according to the ordinary method is immersed in said solution, and then taken therefrom and dried at 50°–60° C. for 2–3 hours. Then, the dried sintered nickel is subjected to reduction in a hydrogen gas stream by heating it to 250° C. for 30 minutes and successively to 320° C. for 30 minutes. The reduction at such two stages of temperature is preferable to control the sublimation of antimony chloride. The thus obtained sintered matrix, to which a mixture of nickel and antimony has been added, is immersed then in butyl alcohol containing a small amount of palladium chloride in an aqueous hydrochloric acid solution and left at room tempearture for 100 hours. The palladium chloride used in that case is adjusted so that the palladium content of the salt may be 1.5 mg./cm.$^2$ of electrode surface area. Palladium is thereby deposited onto the sintered matrix due to a difference in the oxidation potential. Then, the deposited matrix is washed with water, dried and used as an electrode.

(2) An aqueous solution is to be prepared by adding nickel chloride, antimony chloride and copper chloride to water. In that case, the respective salts are taken so that a ratio of nickel: antimony: copper may be 7:2:1, and 100 g. of water is added to 100 g. of a mixture of said salts. A sintered nickel obtained according to the ordinary method is immersed in said solution, then taken therefrom and dried at 60° C. for 2–3 hours. Then, the dried sintered nickel is immersed in an aqueous 30% caustic potassium solution containing a very small amount of hydrazine. Reduction starts after 2 or 3 minutes. After 5 to 8 minutes from the immersion, hydrazine is added to the solution so that the solution may finally become an aqueous caustic potassium solution containing 20 to 25% by weight of hydrazine. Then, the sintered nickel is left in the solution in the immersed state for 3 to 4 hours, to complete the reduction. The use of a small amount of hydrazine at the start in place of a large amount of hydrazine is effective for preventing disengagement of the salts filled in the sintered matrix plate by a sudden reduction. Then, the sintered nickel is washed with water and dried. Palladium is then deposited to the thus obtained dried sintered nickel in the same manner as described in 1, using acetone as the solvent in place of butyl alcohol.

(3) An aqueous solution is to be prepared by adding nickel chloride, antimony chloride and iron chloride to water. In that case, the respective slats are taken so that a ratio of nickel: antimony: iron may be 7:2:2, and 80 g. of water is added to 100 g. of a mixture of the salts. A sintered nickel obtained according to the ordinary method is immersed in the solution, taken therefrom and dried at 50°-60° C. for 2 to 3 hours. Then, the dried sintered nickel is immersed in an aqueous 30% caustic potassium solution containing a very small amount of hydrazine. Reduction is completed by further adding hydrazine to the solution in the same manner as in 2, and furthermore, the same amount of palladium is deposited onto the matrix plate in the same manner as in 1.

The electrode obtained according to 1 is designated as (A), the electrode according to 2 (B), the electrode according to 3 (B)', an electrode containing only nickel and antimony (C) as a reference, and electrode containing only nickel, to which palladium is added, (D) as a reference, and hydrazine-air fuel cells as shown in FIG. 1 are prepared using said electrodes as a hydrazine electrode.

FIG. 1 is a schematic cross-sectional view of a unit cell prepared using said electrode, wherein numeral 1 is a fuel electrode comprised of any one of the electrodes (A) to (D); is a lead terminal plate; 3 is the well-known air diffusion electrode 4 is its lead terminal plate; 5 is a porous separator; 6 is a cell shell; 7 is an aqueous 30% caustic potassium solution containing 3% by weight of hydrazine (hydrazine hydrate: $N_2H_4$—$H_2O$), which is supplied from 8 and discharged from 9, while being circulated.

A current-potential characteristic of the hydrazine electrode at the initial stage of the discharge was investigated by means of a vacuum tube voltmeter using a Luggin capillary tube in said cell. In that case, the ambient temperature was 33° C. and the temperature within the cell (a liquid temperature) was 35±2° C. The results are shown in FIG. 2. When the hydrazine electrodes were fresh, the electrodes (A) to (C) were excellent, and it seems in view of the fact that particularly the electrode (C) showed a good performance, that the electrode containing only nickel and antimony would be sufficient.

Then, the life tests of the cells using these electrodes (A) to (D) were conducted. Continuous discharge was carried out at a discharge current density of 70 ma./$cm.^2$. The results are shown in FIG. 3. It is seen that when the life requirement for a cell is less than 3,000 hours under that condition, the electrode (C) can be used, but when the life requirement is more than 3,000 hours, the electrode (C) cannot be used due to a considerable deterioration in the performance. Further, in the case of the electrode (D), the potential is poor from the start and is not sufficient. As compared with these electrodes (C) and (D), the electrodes (A) and (B) of the persent invention can maintain a good performance for a prolonged period of time. It is clear from the results shown in FIGS. 2 and 3, that the antimony added to the nickel can have a good effect upon the performance for a much prolonged period of time when a catalyst of the metal of the platinum group is further added thereto.

As regards (B)', almost same characteristic as that for (B) could be obtained upon the above investigation, and thus the results as regards (B)' are not shown in FIGS. 2 and 3.

In the foregoing example, an immersion-reduction method for the sintered nickel matrix has been described, but a sintered nickel containing powdered carbon as an additive can be used. Further, electrodes of such materials as active carbon, graphite, tungsten carbide, tungsten bronze or the like materials usually used as a porous electrode can be, of course, employed. Furthermore, a solution mixture of nickel salt and antimony salt or a solution mixture containing other metal salts such as copper salt, iron salt, etc. in addition to said nickel salt and antimony salt, can be added to a powdered electro-conductive material such as powdered carbon; the resulting mixture can be subjected to reduction and further to reduction after a solution of salts of the platinum group has been added thereto. The thus obtained powdered carbon containing the catalyst can be prepared into an electrode by pressure-molding the carbon and a porous metal plate such as a metal screen or expanded metal by means of such a binder as polystyrene or a fluorine resin. However, with respect to the performance, it seems that the use of sintered metal is best among the various methods.

As regards the mixing ratio of antimony to nickel, it has been found that the presence of even a small amount of antimony is effective, but an optimum mixing ratio of antimony to nickel is in a range of 20 to 70% by weight.

In the foregoing example, chlorides of nickel and antimony are used as the salts thereof. The chlorides are preferable in view of the preparation technique, but as to the nickel, the ordinary nickel salts, such as nickel nitrate, nickel sulfate or nickel acetate, can be used. As to the antimony, other salts than antimony chloride are readily hydrolized, and thus, for example, such a reduction procedure based on the use of antimony oxide ($Sb_2O_3$) has been proposed, wherein the antimony oxide is mixed with a nickel salt, then evaporated to dryness over a water bath and then reduced.

When a nickel is used as an electrode matrix in preparing a mixture of nickel and antimony, and the nickel matrix is immersed in an aqueous hydrochloric acid solution containing, for example, antimony chloride as an antimony compound and dried, a portion of the nickel matrix is converted to nickel chloride by a free acid (hydrochloric acid) in the solution and the same state as if the matrix is immersed in a salt mixture of the nickel salt and antimony salt can be obtained. Thus, the matrix can be subjected to reduction and then a metal of the platinum group can be added to the reduced matrix.

We claim:

1. A method for preparing a fuel cell electrode containing as a catalyst a mixture of nickel metal and antimony metal and a metal of the platinum group comprising:
   (a) forming a solution mixture of a nickel salt and an antimony compound,
   (b) immersing an electro-conductive porous material as the electrode matrix in the solution mixture formed in step (a),
   (c) then reducing the nickel salt and antimony compound to form the metals thereof,
   (d) adding a solution of metal salt of the platinum group to said porous material containing said reduced nickel and antimony, and
   (e) reducing said metal salt of the platinum group.

2. A method according to claim 1 wherein said electro-conductive material is a sintered nickel plaque and said plaque is removed from said solution mixture of nickel salt and antimony compound after step (b) and then dried prior to step (c) and wherein the reduction of step (c) is in a hydrogen atmosphere thereby adding the mixture of nickel metal and antimony metal to said matrix.

3. A method according to claim 2 wherein the metal of the platinum group is deposited onto said porous material in step (d) by the difference in oxidation potential.

4. A method according to claim 2 wherein said metal salt of the platinum group is platinum or palladium.

5. A method according to claim 2 wherein the solution of said metal salt of the platinum group is in a non-aqueous solvent.

6. A method according to claim 5 wherein said non-aqueous solvent is alcohol or acetone.

7. A method for preparing a fuel cell electrode containing as a catalyst a mixture of nickel metal and antimony metal and metal of the platinum group consisting:
   (a) impregnating a powdered electro-conductive material with a solution mixture of a nickel salt and an antimony compound,
   (b) reducing the nickel salt and antimony compound of the thus impregnated powdered electro-conductive material thereby adding a mixture of nickel metal and antimony metal to the electro-conductive material,
(c) then impregnating said electro-conductive material with a solution containing a metal salt of the platinum group,
(d) reducing the metal salt of the platinum group of the thus impregnated electro-conductive material thereby adding the metal of the platinum group to said material,
(e) mixing a binder with said powdered electro-conductive material and
(f) integrating said material mixed with said binder under pressure with a porous plate.

8. A method for preparing a fuel cell electrode containing as a catalyst a mixture of (1) nickel metal, (2) antimony metal and (3) at least one metal selected from the group consisting of copper, iron, silver and cobalt, and (4) a metal of the platinum group comprising:
(a) forming a solution mixture of a nickel salt and antimony compound, and at least one member of the group consisting of salts of copper, iron, silver and cobalt,
(b) immersing an electro-conductive porous material as the electrode matrix in the solution mixture formed in step (a),
(c) reducing the nickel salt, antimony compound and at least one member of the group consisting of salts of copper, iron, silver and cobalt to form the metals thereof,
(d) adding a solution of a metal salt of the platinum group to said porous material containing said reduced nickel, antimony and said at least one member,
(e) reducing the metal salt of the platinum group.

9. A method according to claim 8 wherein said electro-conductive material is a sintered nickel plaque and said plaque is removed from said solution mixture after step (b) and then dried prior to step (c) and wherein the reduction of step (c) is in an alkaline solution containing a reducing agent.

10. A method for preparing a fuel cell electrode containing as a catalyst a mixture of (1) nickel metal, (2) antimony metal and (3) at least one metal selected from the group consisting of copper, iron, silver and cobalt, and (4) a metal of the platinum group comprising:
(a) impregnating a powdered electro-conductive material with a solution mixture of nickel salt, an antimony compound, and at least one member of the group consisting of salts of copper, iron, silver and cobalt,
(b) reducing the nickel salt, animony compound and said at least one member of the group consisting of salts of copper, iron, silver and cobalt of the thus impregnated powdered electro-conductive material thereby adding a mixture of (1) nickel metal, (2) antimony metal and (3) said at least one metal selected from the group consisting of copper, iron, silver and cobalt to the electro-conductive material,
(c) then impregnating said electro-conductive material with a solution containing a metal salt of the platinum group,
(d) reducing the metal salt of the platinum group of the thus impregnated electro-conductive material thereby adding the metal of the platinum group to said material,
(e) mixing a binder with said powdered electro-conductive material and
(f) integrating said material mixed with said binder under pressure with a porous plate.

11. A method for preparing a fuel cell electrode containing as a catalyst a mixture of nickel metal and antimony metal and a metal of the platinum group comprising:
(a) immersing a porous material having a nickel layer at least on its surface into a solution containing an antimony salt,
(b) removing said porous material containing said nickel layer and said antimony salt from said solution,
(c) drying said porous material,
(d) reducing said antimony salt to form the metal thereof,
(e) then immersing said porous material in a solution of a metal salt of the platinum group thereby depositing said metal of the platinum group onto the porous material.

References Cited
UNITED STATES PATENTS 3,340,097  9/1967  Hess et al. _____ 136—120
3,340,098  9/1967  Smith _____ 136—120

FOREIGN PATENTS 1,106,708  3/1968  Great Britain _____ 136—120

WINSTON A. DOUGLAS, Primary Examiner

M. J. ANDREWS, Assistant Examiner

U.S. Cl. X.R.
75—109; 117—131

UNITED STATES PATENT OFFICE
CERTIFICATE OF CORRECTION

Patent No. 3,666,565  Dated  May 30, 1972

Inventor(s) Masataro FUKUDA and Tsutomu IWAKI

It is certified that error appears in the above-identified patent and that said Letters Patent are hereby corrected as shown below:

Column 1, under Claims priority:

"Dec. 26, 1968, 43/667" should read

--Dec. 26, 1968, 44/667--;

"Nov. 10, 1969, 44/28,767" should read

--April 10, 1969, 44/28,767--.

Signed and sealed this 6th day of March 1973.

(SEAL)
Attest:

EDWARD M. FLETCHER, JR.  ROBERT GOTTSCHALK
Attesting Officer  Commissioner of Patents